United States Patent [19]
Belot

[11] 4,286,204
[45] Aug. 25, 1981

[54] DEVICE FOR CONTROLLING THE CHARGING OF A STORAGE BATTERY

[75] Inventor: Pierre Belot, Pavillons Sous Bois, France

[73] Assignee: Saft-Societe des Accumulateurs Fixes et de Traction, Romainville, France

[21] Appl. No.: 66,384

[22] Filed: Aug. 14, 1979

[30] Foreign Application Priority Data

Aug. 30, 1978 [FR] France ............................ 78 24996

[51] Int. Cl.³ .......................... H02J 7/04; H02J 9/06
[52] U.S. Cl. ...................................... 320/31; 320/37; 307/66
[58] Field of Search ...................... 320/15, 17, 19, 20, 320/21, 28, 30, 31, 37, DIG. 1, 38; 307/66

[56] References Cited
U.S. PATENT DOCUMENTS 3,795,818  3/1974  Beaman et al. ........................ 307/66
3,992,658  11/1976  Bechtold et al. ...................... 320/20

FOREIGN PATENT DOCUMENTS 1588286  9/1970  Fed. Rep. of Germany ............. 320/37
2438917  2/1976  Fed. Rep. of Germany ............. 320/37
7324491  3/1975  France ...................................... 320/30
1436819  5/1976  United Kingdom ...................... 320/37

Primary Examiner—J. V. Truhe
Assistant Examiner—Richard M. Moose
Attorney, Agent, or Firm—Kenyon & Kenyon

[57] ABSTRACT

A device for controlling the charging of a storage battery includes two counters (IC1, IC2) measure a minimum discharge time and a maximum charging time and are controlled by means of logic gates (2, 3) according to whether the main current is supplied or not. The device has application to maintaining a battery permanently charged despite interruptions in the mains current supply.

8 Claims, 2 Drawing Figures

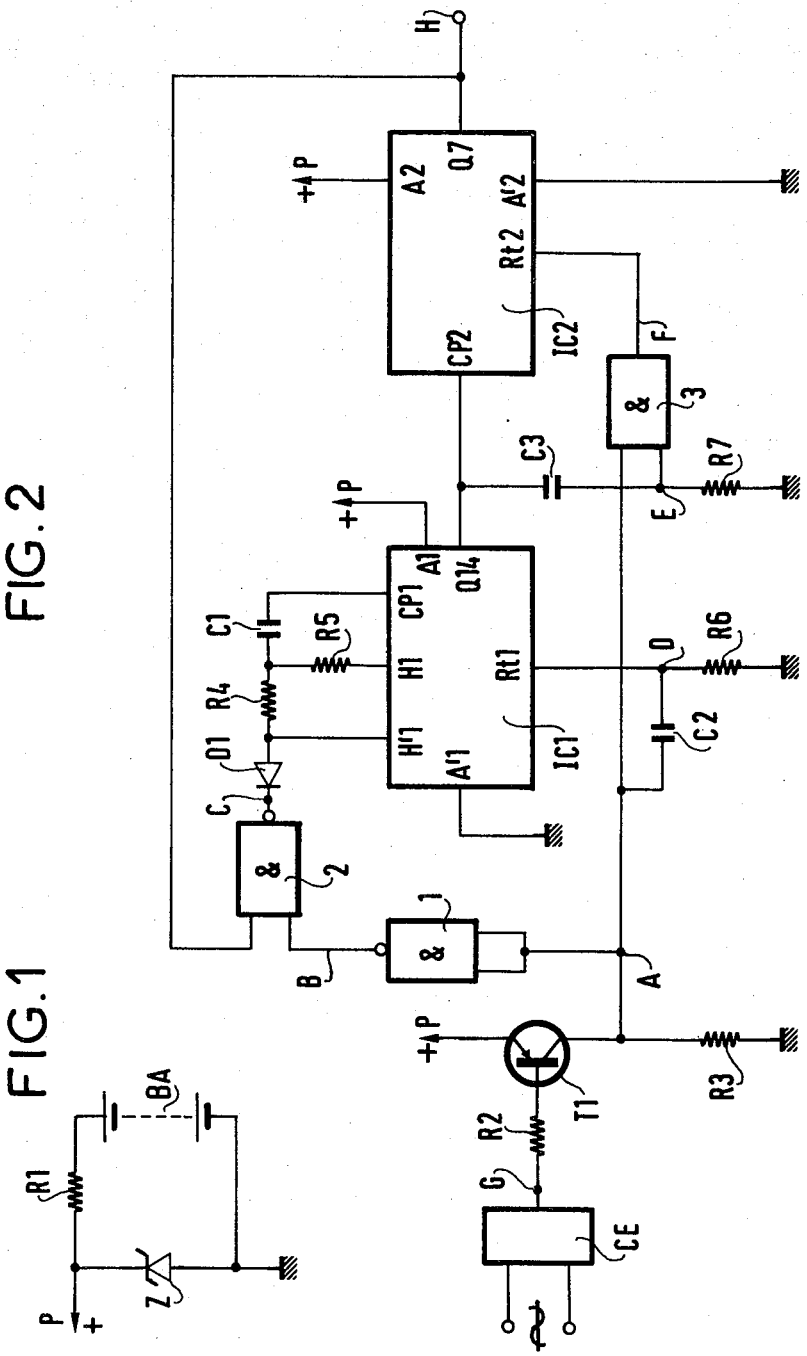

DEVICE FOR CONTROLLING THE CHARGING OF A STORAGE BATTERY

The present invention relates to a device for controlling the charging of a storage battery, and in particular to a device which ensures that the storage battery is charged for a predetermined length of time and only after said battery has been discharging for a time longer than a predetermined minimum.

BACKGROUND

The invention applies in particular to the rapid charging of an emergency battery which is used as a source of electricity during a mains power cut. It is well known in such a case to measure the discharge time of the battery or the ampere-hours discharged and then to recharge the battery at a relatively rapid rate for a time which is a function of the previous discharge, and then to charge the battery at the maintenance charge rate or to stop charging completely as the case may be. The devices used for this purpose are relatively complicated and expensive. In some cases, a rapid fixed charge can suffice, e.g. at constant voltage, particularly when such charges are limited to occasions when the preceding discharge has exceeded a minimum duration, in order to avoid too frequent overcharging of the battery.

For this purpose it is already known to use a first timer which is automatically reset to measure the discharge time and a second timer to measure the charge time. This solution is expensive and the present invention provides a solution to the problem with a reliable and inexpensive device.

THE INVENTION

The present invention provides, in a first aspect, a device for controlling the charging of a storage battery which is used for supplying power when mains current is absent, said device including first means for detecting when no mains current is supplied, second means for comparing the time during which no mains current is supplied with a first predetermined period, third means for measuring a second predetermined period during which the battery is recharged at a given rate and fourth means for controlling the second and third means as a function of the data given by the first means, wherein the second means consist of a first counter and a clock, the third means consist of a second counter in series with the first, the fourth means consist of: a first logic operator which receives first data given by the first means and second data which corresponds to the state of the second counter and which consequently emits a third data which prevents the operation of the clock when the mains current is supplied and when the second counter reaches a given state, said third data allowing the clock to operate in all the other cases; a means for transmitting said first data to the first counter, said means initializing it when no mains current is supplied; and a second logic operator which receives the first data and a fourth data which corresponds to the state of the first counter and which emits a fifth data which initializes the second counter when no mains current is supplied and when the first counter reaches a given state.

In this way, during a mains power cut and when the battery begins to discharge, the clock is started and the first counter is initialized, but the second counter is initialized only when the first counter reaches a given state, with the time it takes for it to reach this state corresponding to the minimum discharge time after which the battery may be charged again at a relatively rapid rate, i.e. at a rate higher than the maintenance charge rate. After the power cut, the clock continues to operate and both counters count. When the second counter reaches a given state which corresponds to the rapid rate battery charging time, data significant of this state is transmitted to the first logic operator and is combined with the data significant of mains current being available to stop the clock.

In a second aspect the present invention provides a device for controlling the charging of a storage battery which is used for supplying power when mains current is absent, said device including:

an input circuit for receiving the mains current and supplying a signal which shows whether or not the mains current is being supplied;

means for comparing the time during which no mains current is supplied and a first predetermined time which constitutes a "minimum discharge time"; and means for controlling charging to supply a charging control signal to an output terminal which controls a battery charger supplied with electricity by the mains and thus to control the charging of the battery during a second predetermined time when the input circuit detects the return of mains current and when said comparison means detect when mains current has been absent for longer than the first predetermined time, wherein these comparison and control means include:

a clock for delivering clock pulses;

a clock control logic circuit connected to the input circuit and to the output terminal to operate the clock if no mains current is applied or if the charging control signal is supplied;

a first counter which receives the clock pulses and is controlled by the input circuit so as to count the clock pulses from zero when no mains current is supplied, the counter supplying a "permission to charge" signal when it has counted a first predetermined number which represents a "minimum discharge time" and starting again from zero when it has counted a second predetermined number which is higher than the first;

a second counter which receives the clock pulses and which is suitable for counting a third number which is higher than the second and which represents a "maximum charging time", the counter supplying said charging control signal to the output terminal as soon as it is operating and as long as it has not counted the third predetermined number; and a third logic circuit connected to the input circuit and to the first counter, said circuit controlling the second counter so as to make it count from zero if no mains current is supplied when the first counter supplies the permission to charge signal.

THE DRAWING

The invention will be better understood from the following description of an embodiment, given with reference to the accompanying drawing, in which:

FIG. 1 illustrates the power circuit of a device in accordance with the invention; and FIG. 2 is a circuit diagram of one embodiment of a device in accordance with the invention.

DETAILED DESCRIPTION

FIG. 1 shows separately the current source of the device. The current source is constituted by the battery BA to be charged, whose positive pole is connected via a resistor R1 to a point P to apply a positive potential thereto. The negative pole of the battery is connected to earth. The voltage supplied to the device is stabilized by a Zener diode Z between the negative pole of the battery and the point P.

In FIG. 2, a point G is connected to the mains by a circuit CE arranged to maintain this point at the same potential as the point P when mains current is applied, and at zero potential when mains current is not applied. Generally, the potential of the point P represents logic level 1 for the components of the circuit which is described hereinbelow and the earth potential represents the logic level 0.

The point G is connected via a resistor R2 to the base of a PNP transistor T1 whose emitter is connected to the point P and whose collector is connected to earth via a resistor R3, as well as directly to a point A which is connected to the inputs of a NAND gate 1, connected as an inverter, whose output B is connected to a first input of a NAND gate 2. The output C of the gate 2 is connected via a diode D1 to the oscillator circuit of a clock which includes a capacitor C1 connected to the anode of the diode D1 via a resistor R4 and to the input CP1 of a counter IC1. The point which is common to the anode of D1 and to the resistor R4 is connected to a point H'1 and the point common to the capacitor C1 and to the resistor R4 is connected to a point H1. H1 and H'1 correspond to the rest of the circuit included in the counter IC1 to constitute the clock of the counter. The point Rt1 (initializing input) of the counter IC1 is connected to a point D which is connected firstly to the point A via a capacitor C2 and secondly to earth via a resistor R6. The points A1 and A'1 are the power supply inputs of the counter IC1 and are connected respectively to the point P and to earth. An output Q14 of the counter IC1 transmits clock pulses to an input CP2 of a counter IC2 whose power supply inputs A2 and A'2 are connected respectively to the point P and to earth. An output, e.g. Q14, of the counter IC1, is connected via a capacitor C3 to a point E which corresponds to an input of an AND gate 3. The point E is earthed via a resistor R7.

The output F of the gate 3 is connected to the input Rt2 (initializing input) of the counter IC2. The output Q7 of the counter IC2 is connected firstly to a point H and secondly to the second input of the gate 2. The point H is connected to the charger (not shown) of the battery BA and allows or prevents rapid charging according to its logic level.

The device operates as follows.

When the mains current is applied, the transistor T1 is off and the point A is at level 0. The point B is therefore at level 1. Supposing that the battery is charged, the output Q7 (and therefore the point H) is at level 1. Since both inputs of the gate 2 are at level 1, its output C is at level 0 and the diode D1 inhibits the clock. Therefore, the states of the counters IC1 and IC2 do not move.

When the mains current is no longer applied, the transistor T1 becomes saturated and the point A rises to level 1. The point B is therefore at level 0 and the output C of the gate 2 changes to level 1. The clock starts oscillating. Simultaneously, a pulse from A reaches the input Rt1 via the point D and initiates the counter IC1, which begins to count.

If the mains current is again applied before the output Q14 has changed to level 1, the preceding conditions are again found: the counter IC2 has not changed state, the point H remains at level 1. The battery BA is not put on charge, since the point H must be at level 0 to allow the battery to be charged at the rate higher than the maintenance charging rate.

In contrast, if the mains current is still not applied when the output Q14 changes to level 1, this corresponding, in the present example, to the counter having counted through half of its states, the point E receives a pulse at level 1 via the capacitor C3. The point F changes to level 1 and the input Rt2 initiates the counter IC2 whose output Q7 changes to level 0, thereby switching the charger to its higher charging rate.

While no mains current is applied, the counter IC1 continues to count. If no mains current is applied to IC1 for a time sufficiently long to allow the counter to count through all its states, the counter returns to 0 and begins to count again. After the predetermined time, the point Q14 again changes from 0 to 1. This resets the counter IC2 to 0. The counter IC2 is therefore periodically reset to 0. This resetting to 0 takes place at intervals of time which are twice the predetermined minimum discharge time, since the minimum discharge time corresponds to half the total count of the counter IC1. This period is much shorter than the counting time of the counter IC2, so the point Q7 does not change state.

When mains current becomes available again, the point Q7 is therefore still at level 0. The battery BA is then charged at a higher rate than its maintenance rate and continues such charging until Q7 changes to level 1. The duration of high rate charge therefore practically corresponds to the total counter IC2, which thereby constitutes a maximum charging time.

The effective charging time may be shortened by a time which is less than the total counting time of the counter IC1, this time being negligible vis-a-vis the effective charging time of the counter IC1. As long as the point Q7 remains at level 0, the point C remains at level 1 whatever the state of the point B may be. Therefore, the clock continues to operate as long as the counter IC2 has not reached its full count and as long as the point Q7 is not at level 1. When the counter is full, the points Q7 and H change to level 1. This stops the rapid charging of the battery and also stops the clock.

If there is another power cut before Q7 changes to level 1, the new pulse which is applied to the point D makes the counter IC1 start again from zero. When mains current is again supplied, one of two things occurs:

either the mains current is not available for a period less than the minimum time, Q14 does not change to level 1, and the battery resumes charging at the level at which it was stopped and the counter IC2 continues to count uninterrupted, the gate 3 preventing it from being reset to 0 when the mains current is re-applied; or the mains current is not available for longer than the minimum time and Q14 changes to level 1 and the counter IC2 is reset of 0. Rapid charging is resumed when the mains current is re-applied and lasts for the maximum time.

To give a clear idea of the situation, a few numerical indications are given hereinbelow by way of example.

The counters IC1 and IC2 are C-MOS circuits, the counter IC1 being of the 4060 type and the counter IC2 being of the 4024 type. The minimum discharge time is 5 minutes during which there are $2^{13}$ clock pulses (until the level of Q14 changes). The counter IC2 is reset to 0 every 10 minutes while mains current is not applied.

The charging time lasts 12 hours or, more exactly, lies between 12 hours and 11 hours 50 minutes.

The applicant presently uses integrated circuits manufactured by RCA under the designations CD 4060 and CD 4024, with the following correspondances between points named in this description and device pin numbers:

| CD 4060 | | CD 4024 | |
|---|---|---|---|
| point | pin N° | point | pin N° |
| A1 | 16 | A2 | 14 |
| A'1 | 8 | A'2 | 7 |
| H1 | 10 | CP2 | 1 |
| H'1 | 11 | Rt2 | 2 |
| CP1 | 9 | Q7 | 3 |
| Rt1 | 12 | | |
| Q14 | 3 | | |

However, it will be appreciated that these circuits are also manufactured by others, and that different packages may have different pin designations. Also, equivalent logic functions can be provided using different arrangements of commercially available logic circuits which need not necessarily be of the C-MOS type, although low power consumption is naturally preferred.

I claim:

1. A device for controlling the charging of a storage battery which is used for supplying emergency power when mains current is interrupted, said device including first means for detecting when no mains current is being supplied, second means for comparing the time during which no mains current is supplied with a first predetermined period, third means for measuring a second predetermined period during which the battery is recharged at a given rate and fourth means for controlling the second and third means in response to data given by the first means, wherein:

the data given by the first means comprises a first datum corresponding to the presence of mains current and a second datum corresponding to the absence of mains current, the second means comprises a first counter and a clock, the third means comprises a second counter connected in series with the first counter, and the fourth means comprises a first logic operator having inputs connected to the first means and the second counter for receiving said data given by the first means and additional data which correspond to the state of the second counter and having an output which transmits a third datum upon concurrent receipt of said second datum from the first means when the mains current is supplied and a fourth datum from the second counter corresponding to the second counter having reached a predetermined state, said output of the first logic operator being connected to the clock for allowing the clock to operate in all cases except when said third datum is being emitted;

a means for transmitting said second datum from the first means to the first counter for initiating said first counter when mains current is interrupted; and a second logic operator having inputs connected to said first means and said first counter and an output which emits a fifth datum upon concurrent receipt of said second datum from the first means and a sixth datum which corresponds to a predetermined state of the first counter for initiating the second counter when mains current is still absent after the first counter has reached said predetermined state.

2. A device according to claim 1, wherein the first means comprises a transistor which may be in one of two states: off or conductive; one state corresponding to when the mains current is supplied and the other state to when no mains current is supplied.

3. A device according to claim 1 or 2, wherein the first datum consists of a first potential level when mains current is supplied, and said second datum consists of a second potential level when no mains current is supplied.

4. A device according to claim 3, wherein the first potential level represents logic level 0 for logic counters and logic operators and the second potential level represents logic level 1.

5. A device according to claim 3, wherein the first logic operator is a NAND gate of which said first input is connected to said point via an inverter, said second input is connected to an output of the second counter and said output is connected to the clock via a diode which prevents current from passing when the output of the NAND gate is at logic level 0.

6. A device according to claim 3, wherein said means for transmitting said data from the first means to the first counter comprises a capacitor connected between said point and a reset-to-zero input of the first counter.

7. A device according to claim 3, wherein the second logic operator is an AND gate, one of whose inputs is connected to said point the other of whose inputs is connected to an output of the first counter via a capacitor, and whose output trigger the second counter upon emission of said datum.

8. A device for controlling the charging of a storage battery which is used for supplying power when mains current is absent, said device comprising:

an input circuit for receiving the mains current and supplying a signal which shows whether or not the mains current is being supplied;

time comparison means for comparing the duration of time during which no mains current is supplied and a first predetermined time period which constitutes a "minimum discharge time"; and charging control means for supplying a charging control signal to an output terminal for transmission to a battery charger supplied with electricity by the mains to actuate the charger for charging the battery at a high rate during a second predetermined time period starting after the input circuit detects the return of mains current and said comparison means detects when mains current has been absent for longer than the first predetermined time, wherein these time comparison and charging control means include:

a clock for delivering clock pulses;

a clock control logic circuit connected to the input circuit and to the output terminal to operate the clock only if no mains current is applied or if the charging control signal is supplied;

a first counter which receives the clock pulses and is controlled by the input circuit so as to count the clock pulses starting from zero when mains current is interrupted, the counter supplying a "permission to charge" signal when it has counted a first predetermined number which represents a "minimum discharge time" and starting again from zero when it has counted a second predetermined number which is higher than the first predetermined number;

a second counter which receives the clock pulses and which is suitable for counting a third predetermined number which is higher than the second predetermined number and which represents a "maximum charging time", the second counter supplying said charging control signal to the output terminal from the start of its count, and as long as it has not counted the third predetermined number; and a logic circuit for controlling the second counter, said logic circuit having inputs connected to the input circuit and to the first counter and an output connected to the second counter, said logic circuit controlling the second counter so as to make it count from zero if no mains current is supplied when the first counter supplies the "permission to charge" signal.

* * * * *